UNITED STATES PATENT OFFICE.

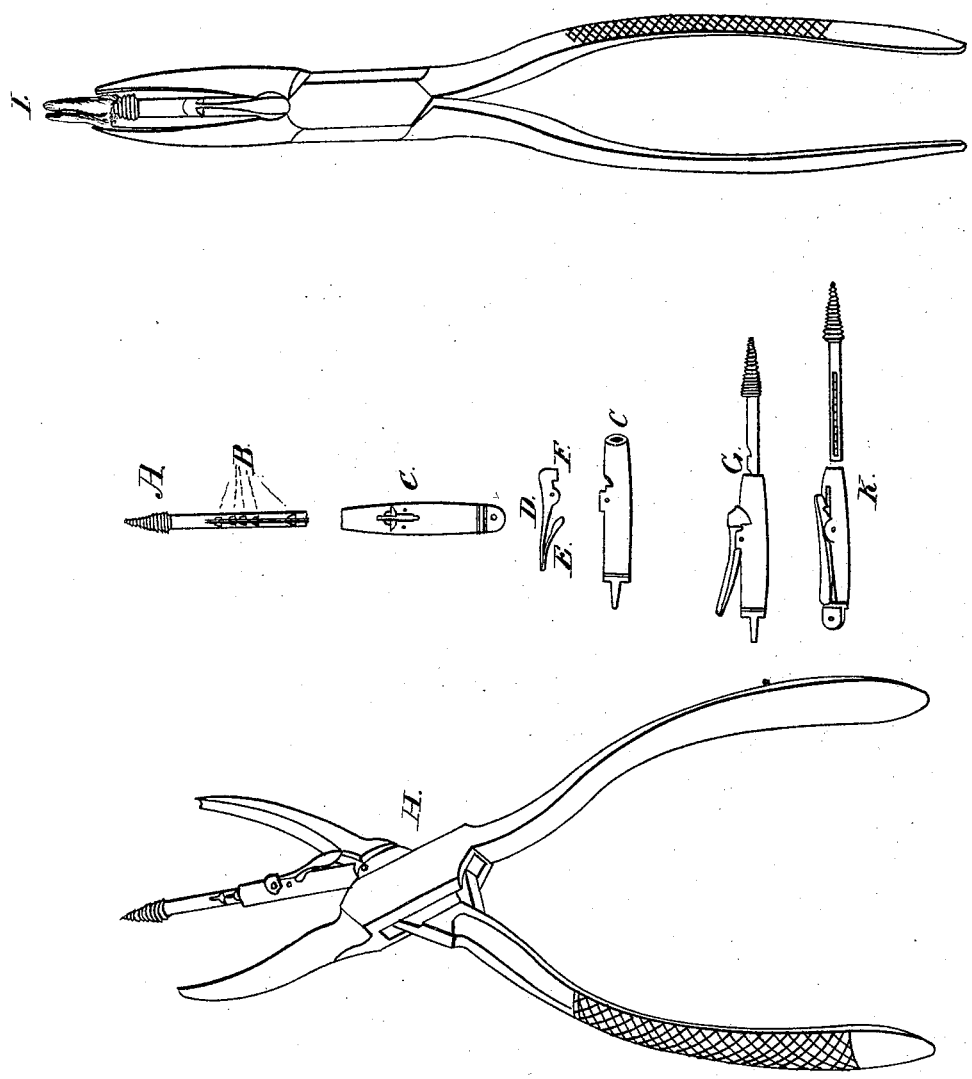

CHARLES H. DUBS, OF NATCHEZ, MISSISSIPPI.

DENTIST'S INSTRUMENT.

Specification of Letters Patent No. 5,865, dated October 17, 1848.

*To all whom it may concern:*

Be it known that I, CHARLES H. DUBS, of the city of Natchez, in the county of Adams and State of Mississippi, have invented a new and Improved Dental Instrument for Extracting the Roots of Teeth, and hereby declare that the following is a full description.

The instrument is a new combination of the forceps and screw.

A cylindrical tube as C in the accompanying drawings is inserted by tenon and mortise in the male joint of the forceps, and secured with a rivet. When the forceps are open as in H, the tube may be moved to and fro between the beaks of the forceps; and when the latter are closed as in I the tube is firmly clasped and on a line with the axes of the forceps a conical screw A, with a shaft is fitted to the tube.

In the shaft is a groove seen at lower part of A, admitting a square projection F, on the catch of the click D, and the heel of the click, hereinafter described, and the shaft is thus prevented from turning laterally within the tube.

On the outside of the tube is attached a click D, with a spring E, by which it is forced through an aperture within the hollow of the tube. In connection with the click is a series of notches cut into the shaft of the screw intersecting the groove, at right angles, above described as B, in the drawing, so that to whatever length the shaft is inserted in the tube, it is secured by the click and notches and cannot be pulled out without first raising the spring attached to the click. When used, the screw may be protruded at pleasure beyond the beaks of the forceps, or it may be secured on a line with them; and in either case, by means of the groove and its corresponding projection on the click and the heel of the click, the click itself and its corresponding notches in the shaft of the screw, the latter remains stationary and only moves and operates with the forceps.

In extracting the root of a tooth a screw of proper size, so adjusted that its head may protrude at a convenient distance from the beaks of the forceps, is secured in the hollow of the root by the forceps; then the forceps being opened, the shaft of the screw is pushed in the tube until the sides of the root may be grasped by the forceps, as represented by I in the drawing, at which point the shaft is certain to be secured by the click and notches, and cannot turn laterally on account of the groove and projection; then whatever power is applied or movement given to the forceps, equally applies to and directs the screw; and the screw besides preventing the root from being crushed by the forceps is an efficient auxiliary to the forceps in the operation for extraction, namely, by keeping the forceps in place and sharing the power necessary to be applied for operation. The threads made in the hollow of the root by the screw cannot break on account of the pressure of the forceps; and the forceps cannot crush the root on account of the presence and corresponding action of the screw. By the insertion of the screw the root is a solid mass and cannot be crushed; and by the application and simultaneous action of the forceps, the screw is what it never has been before a powerful and well appointed agent for extraction; and the combination of the screw and forceps is an entirely new contrivance for this branch of dental operations.

What I claim as my invention and desire to secure by Letters Patent is—

The combination of the notches B, of the screw A, with the catch of the click D by means of which the screw affords additional power in extracting roots of teeth as above described.

CHARLES H. DUBS.

Witnesses:
J. A. VAN MAESEN,
ALBERT J. COFFIN.